(12) United States Patent
Jang

(10) Patent No.: US 9,119,253 B2
(45) Date of Patent: Aug. 25, 2015

(54) BACKLIGHT UNIT

(71) Applicant: LG Display Co., Ltd., Seoul (KR)

(72) Inventor: Hoon Jang, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/533,272

(22) Filed: Nov. 5, 2014

(65) Prior Publication Data

US 2015/0145434 A1 May 28, 2015

(30) Foreign Application Priority Data

Nov. 26, 2013 (KR) .................... 10-2013-0144703

(51) Int. Cl.
*H05B 37/02* (2006.01)
*H05B 33/08* (2006.01)

(52) U.S. Cl.
CPC ........ *H05B 33/0815* (2013.01); *H05B 33/0845* (2013.01)

(58) Field of Classification Search
USPC ............. 315/209 R, 291, 192, 224, 293, 312, 315/294, 295
See application file for complete search history.

(56) References Cited

U.S. PATENT DOCUMENTS

| 2013/0099697 A1* | 4/2013 | Chen et al. ..................... 315/294 |
| 2013/0300305 A1* | 11/2013 | Wray ............................ 315/210 |
| 2013/0300315 A1* | 11/2013 | Lee et al. ....................... 315/297 |

* cited by examiner

*Primary Examiner* — Minh D A
(74) *Attorney, Agent, or Firm* — Morgan, Lewis & Bockius LLP

(57) ABSTRACT

A backlight unit includes a first switch receiving a constant current applied from an outside circuit and a sensing current, a first comparator receiving an output of the first switch, a second switch receiving an output of the first comparator, a second comparator receiving an output of the second switch; a thin film transistor having a gate electrode receiving an output of the second comparator; a light-emitting diode array connected to a source electrode of the thin film transistor; and a current sensor connected to a drain electrode of the thin film transistor.

6 Claims, 5 Drawing Sheets

BACKLIGHT UNIT

This application claims the priority benefit of Korean Patent Application No. 10-2013-0144703, filed on Nov. 26, 2013, which is hereby incorporated by reference in its entirety.

BACKGROUND OF THE INVENTION

1. Field of the Invention

The present disclosure relates to a backlight unit, and more particularly, a backlight unit providing uniform brightness.

2. Discussion of the Related Art

With development of information technologies, flat panel display (FPD) devices have been further spotlighted as visual information delivery media. To secure further increased competitiveness, the flat panel display devices have been needed to have low power consumption, a thin profile, light weight and high quality. Liquid crystal display (LCD) devices are representative flat panel display devices and display images using optical anisotropy of liquid crystal. The liquid crystal display devices have advantages of a thin profile, small size, lower power consumption, and high quality.

A liquid crystal display device displays images by individually providing picture information to pixels, which are arranged in a matrix form, and controlling transmittance of a liquid crystal layer corresponding to each of the pixels. Therefore, the liquid crystal display device includes a liquid crystal panel, in which pixels as a unit for producing an image are arranged in a matrix form, and a driving unit for driving the liquid crystal panel. In addition, since the liquid crystal panel is not self-luminous, the liquid crystal panel needs an additional lighting control means such that a difference in transmittance is revealed to the outside. A backlight unit is disposed at a rear surface of the liquid crystal panel and is used as a lighting control means.

In general, backlight units are classified into a side light type or a direct type according to a position of a light source with respect to a liquid crystal panel. In side light type backlight units, a light guide plate is disposed under the liquid crystal panel, and one or a pair of lamps, as a light source, are disposed at one side or at each of two sides of the light guide plate. Light from the lamps is refracted and reflected by the light guide plate to be indirectly provided to the liquid crystal panel. In direct type backlight units, a plurality of lamps is disposed directly under the liquid crystal panel, and light from the lamps is directly provided to the liquid crystal panel.

Backlight units include cold cathode fluorescent lamps (CCFLs), external electrode fluorescent lamps (EEFLs), and light emitting diodes (LEDs) as a light source. Among these, LEDs, which do not include toxic mercury (Hg), have been widely used due to their small sizes, low power consumption, and high reliability.

Therefore, a liquid crystal display device may include a liquid crystal panel and an LED backlight unit at a rear surface of the liquid crystal panel.

LEDs include red, green and blue LEDs emitting red, green and blue light, respectively, and are arranged with a predetermined interval between adjacent two thereof.

White light is obtained by lightening the LEDs at the same time and mixing colors. In large-sized liquid crystal display devices, to decrease power consumption, two or ten LEDs constitute a cluster or an array and are repeatedly arranged on a printed circuit board.

The LEDs are driven by a backlight driving circuit. The backlight driving circuit includes a controlling circuit unit, a sensing unit and a plurality of circuit units.

The controlling circuit unit of the backlight driving circuit will be described with reference to accompanying drawings.

FIG. 1 is a circuit diagram of illustrating a controlling circuit unit according to the related art, and FIG. 2 is a view of illustrating a constant current and a sensing current according to time.

In FIG. 1, the controlling circuit unit includes an operational amplifier (OP-AMP) 10, a thin film transistor 15 and a current sensor 18. The operational amplifier 10 maintains a constant current flowing through LEDs.

The thin film transistor 15 includes a gate electrode, a source electrode, and a drain electrode. The gate electrode of the thin film transistor 15 is connected to an output terminal of the operational amplifier 10. The drain electrode of the thin film transistor 15 is connected to the current sensor 18. The source electrode of the thin film transistor 15 is connected to an LED array 19, which includes a plurality of LEDs.

A constant voltage Vref and a constant current Iref, which are supplied from a printed circuit board (not shown), are inputted to a first input terminal of the operational amplifier 10, and a sensing voltage Vsen and a sensing current Isen, which are supplied from an output terminal of the current sensor 18, are inputted to a second input terminal of the operational amplifier 10.

The operational amplifier 10 compares the sensing current Isen with the constant current Iref and adjusts the thin film transistor 15 connected to an output terminal of the operational amplifier 10 such that the sensing voltage Vsen has the same value as the constant voltage Vref.

By performing the processes, the controlling circuit unit controls a luminous current $I_{LED}$ flowing through the LED array 19, and the LED array 19 constantly emits light.

By the way, an offset current $I_{offset}$ may be caused in the operational amplifier 10 due to a process variation. The amount of currents flowing through the LED array 19 may be decreased or increased by the offset current $I_{offset}$. Thus, there is a problem that it is difficult to control the brightness of the backlight unit.

More particularly, the luminous current $I_{LED}$ associated with the brightness of the backlight unit is obtained by comparing the sum of the offset current $I_{offset}$ of the operational amplifier 10 and the sensing current Isen with the constant current Iref and is the same as the sensing current Isen that actually flows through the LED array 19.

Therefore, the luminous current $I_{LED}$, which actually flows through the LED array 19, varies according to the offset current $I_{offset}$.

The operational amplifier 10 is manufactured as a type of an integrated circuit (IC). A plurality of operational amplifiers is built in an integrated circuit, and an output of each of the plurality of operational amplifiers forms a channel.

At this time, a value of the offset current $I_{offset}$ at a channel may be different from that at another channel.

With reference to FIG. 2, since the value of the offset current $I_{offset}$ at a first channel Ch1 is different from the value of the offset current $I_{offset}$ at a second channel Ch2, a luminous current value 22 is smaller than a constant current value 20 by a first difference G1 at the first channel Ch1, and a luminous current value 24 is larger than the constant current value 20 by a second difference G2 at the second channel Ch2.

More specifically, the offset current $I_{offset}$ of each operational amplifier 10 is added to the sensing current Isen outputted from the output terminal of the current sensor 18 and is compared with the constant current value 20.

For example, when the constant current value 20 at the first channel Ch1 is 20 mA, if the luminous current value 22 flowing through the LED array 19 and the current sensor 18 connected to the first channel Ch1 is 19 mA and the value of the offset current $I_{offset}$ is 1 mA, 20 mA, which is the sum of the value of the offset current $I_{offset}$ and the luminous current value 22, is inputted to the operational amplifier 10.

Additionally, when the constant current value 20 at the second channel Ch2 is 20 mA, if the luminous current value 24 flowing through the LED array 19 and the current sensor 18 connected to the second channel Ch2 is 21 mA and the value of the offset current $I_{offset}$ is −1 mA, 20 mA, which is the sum of the value of the offset current $I_{offset}$ and the luminous current value 24, is inputted to the operational amplifier 10.

Accordingly, since 20 mA, which is the sum of the value of the offset current $I_{offset}$ and the luminous current 22 or 24, is inputted to the operational amplifier 10, the operational amplifier 10 judges that a current having the same value as the constant current Iref flows through the LED array 19 and the current sensor 18 and does not change an ON current of the thin film transistor 15. Consequently, even though the current actually flowing through the LED array 19 has a different value from the value of the constant current Iref, the current actually flowing through the LED array 19 is not compensated, and brightness is different at each channel.

Like this, the current having a different value from the value of the constant current Iref is applied to the backlight unit because of the offset current $I_{offset}$, and there is a problem that the backlight unit cannot produce desirable brightness.

SUMMARY OF THE INVENTION

Accordingly, the present invention is directed to a backlight unit that substantially obviates one or more of the problems due to limitations and disadvantages of the related art.

An object of the present invention is to provide a backlight unit that counterbalances an offset current and provides uniform brightness.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a backlight unit includes a first switch receiving a constant current applied from an outside circuit and a sensing current, a first comparator receiving an output of the first switch, a second switch receiving an output of the first comparator, a second comparator receiving an output of the second switch; a thin film transistor having a gate electrode receiving an output of the second comparator; a light-emitting diode array connected to a source electrode of the thin film transistor; and a current sensor connected to a drain electrode of the thin film transistor, wherein the first switch inputs the constant current into a non-inverting terminal (+) of the first comparator and the sensing current into an inverting terminal (−) of the first comparator during a first period, and the first switch inputs the constant current into the inverting terminal (−) of the first comparator and the sensing current into the non-inverting terminal (+) of the first comparator during a second period, and wherein the second switch inputs an output of the non-converting terminal (+) of the first comparator into a non-inverting terminal (+) of the second comparator and an output of the inverting terminal (−) of the first comparator into an inverting terminal (−) of the second comparator during the first period, and the second switch inputs the output of the non-converting terminal (+) of the first comparator into the inverting terminal (−) of the second comparator and the output of the inverting terminal (−) of the first comparator into the non-inverting terminal (+) of the second comparator during the second period.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Reference will now be made in detail to embodiments of the present invention, examples of which are illustrated in the accompanying drawings. Wherever possible, similar reference numbers will be used to refer to the same or similar parts.

Figure 1:
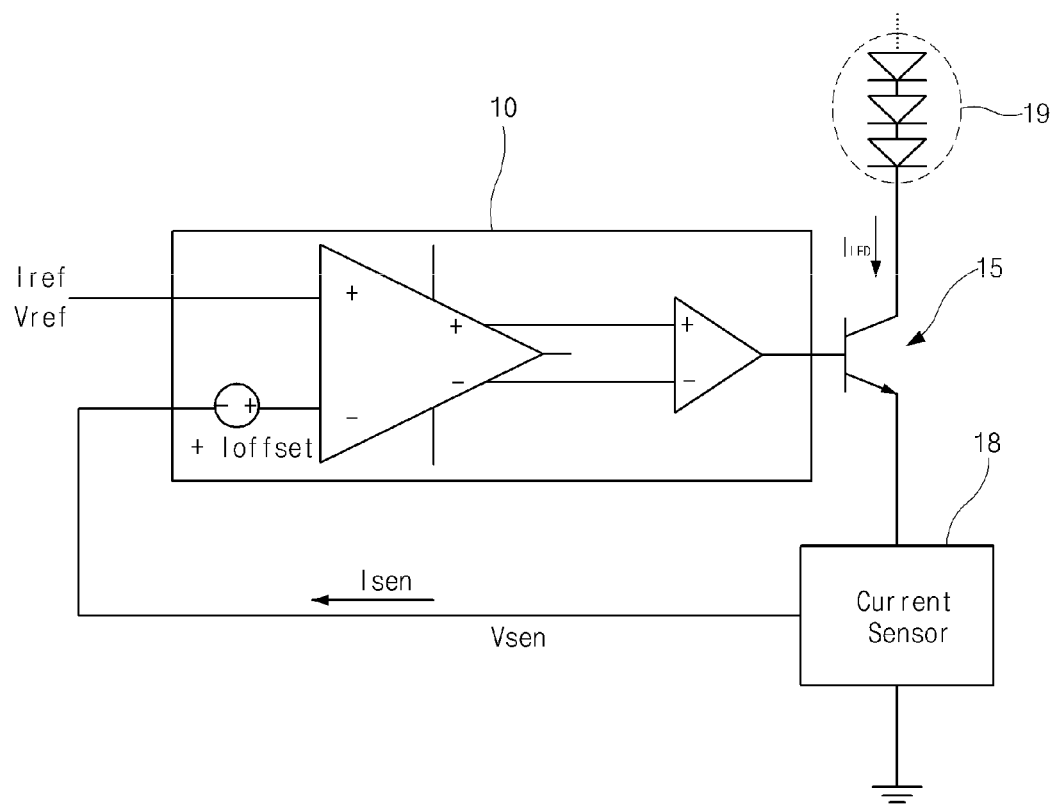
FIG. 1 is a circuit diagram of illustrating a controlling circuit unit according to the related art.
Figure 2:
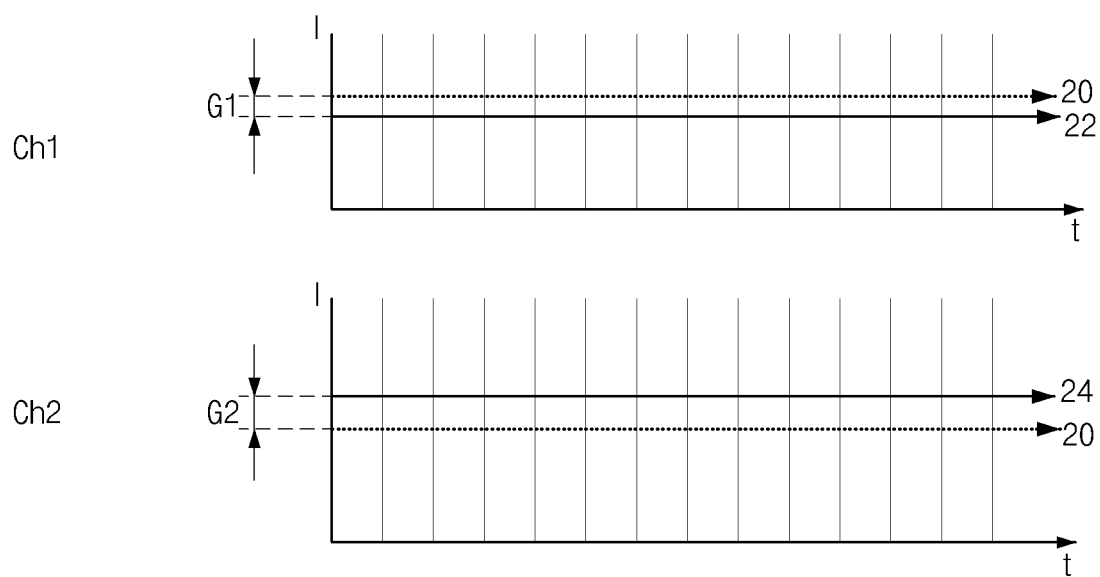
FIG. 2 is a view of illustrating a constant current and a sensing current according to time in the related art.
Figure 3:
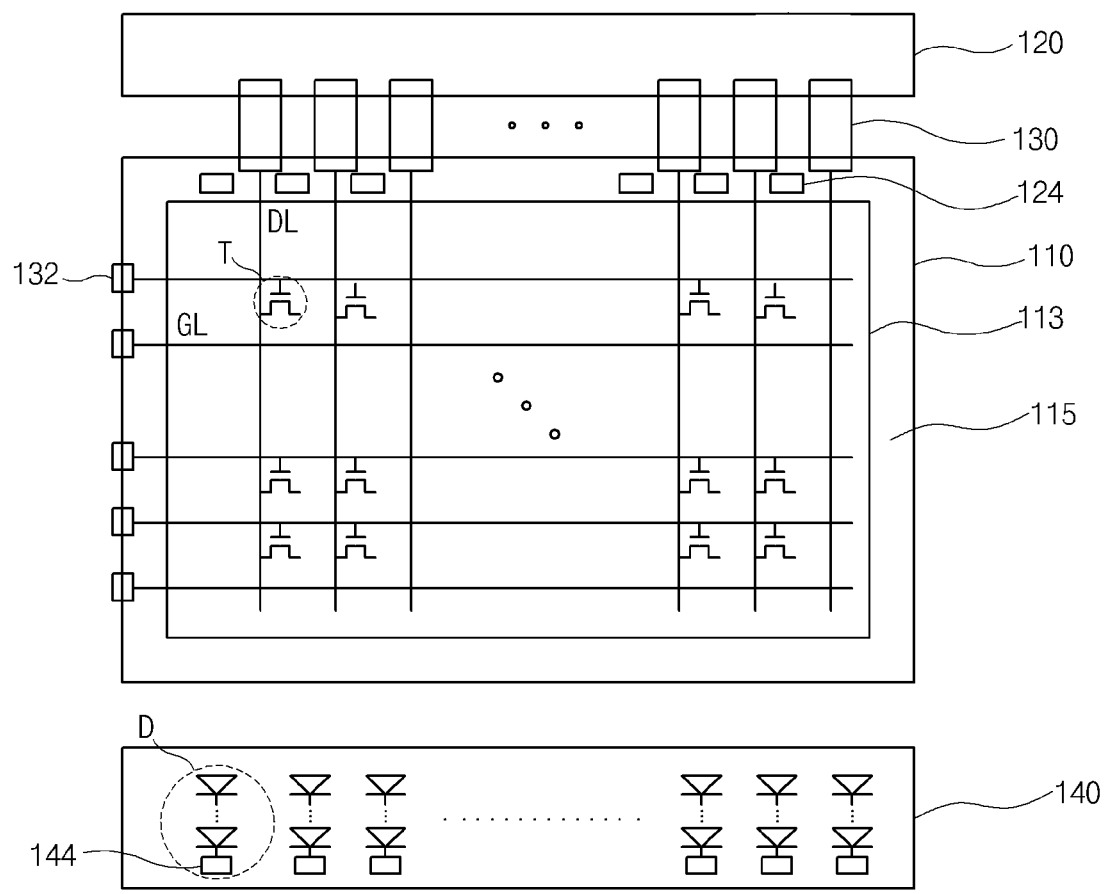
FIG. 3 is a plan view of schematically illustrating an image display device according to an example embodiment of the present invention

FIG. 3 is a plan view of schematically illustrating an image display device according to an example embodiment of the present invention.

In FIG. 3, the image display device displays an image and includes a display panel 110, a printed circuit board (PCB) 120, data and gate drivers 130 and 132, and a backlight unit 140. The display panel 110 includes a display area where the image is shown and a non-display area which surrounds the display area. The printed circuit board 120 provides the display panel 110 with signals for displaying the image. The data and gate drivers 130 and 132, which are disposed between the display panel 110 and the printed circuit board 120, convert the signals from the printed circuit board 120 and apply the signals to the display panel 110. The backlight unit 140 as a dimming means is disposed at a rear side of the display panel 110 and includes light-emitting diodes D and integrated circuits 144.

The printed circuit board 120 is connected to a side of the display panel 110 through the data driver 130.

More specifically, one side of the data driver 130 is attached to the non-display area of the display panel 110, and the other side of the data driver 130 is attached to the printed circuit board 120. The data driver 130 changes image signals or voltage signals from the printed circuit board 120 and applies the image signals or the voltage signals to data lines DL of the display panel 110.

The gate driver 132 is attached to another side of the display panel 110 perpendicularly to the data driver 130. The gate driver 132 receives gate control signals from the printed circuit board 120 through the data driver 130 and applies a gate signal to gate lines GL.

In the display area of the display panel 110, a plurality of pixel regions is defined by crossing the gate lines GL and the data lines DL. A thin film transistor is formed at each pixel region.

Meanwhile, the backlight unit 140 includes the light-emitting diodes D as a light source. In the backlight unit 140, the integrated circuits 144 are mounted to apply controlling signals to the light-emitting diodes D, and each integrated circuit 144 includes a plurality of circuits.

Particularly, the integrated circuit 144 includes a controlling circuit unit (not shown), and the controlling circuit unit controls currents flowing through the light-emitting diodes D.

At this time, a plurality of controlling circuit units may be included in the integrated circuit 144, and for example, the number of controlling circuit units may be 4, 6, 8 or 12.

An offset current $I_{offset}$ may be caused in the controlling circuit unit due to a process variation of the integrated circuit 144, and in the backlight unit according to the example embodiment of the present invention, an effect of the offset current $I_{offset}$ is counterbalanced by first and second switches.

Hereinafter, the controlling circuit unit will be described with reference to accompanying drawings.

Figure 4A:
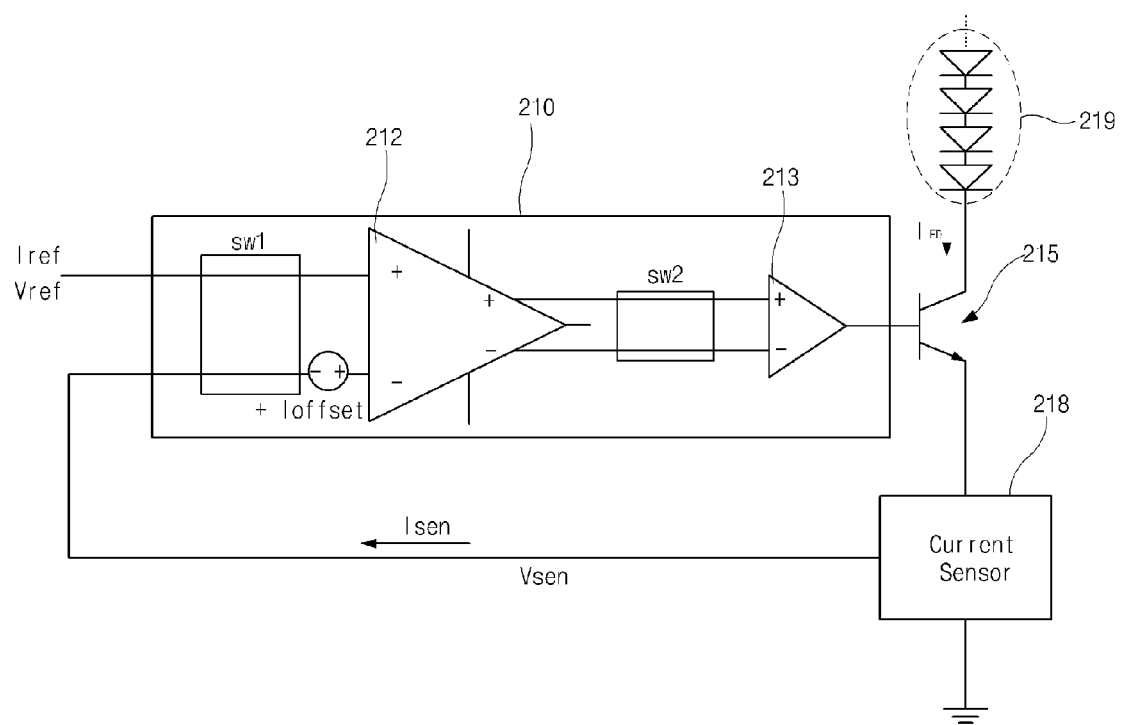
FIG. 4A is a circuit diagram of illustrating a controlling circuit unit during a first period according to an example embodiment of the present invention.
Figure 4B:
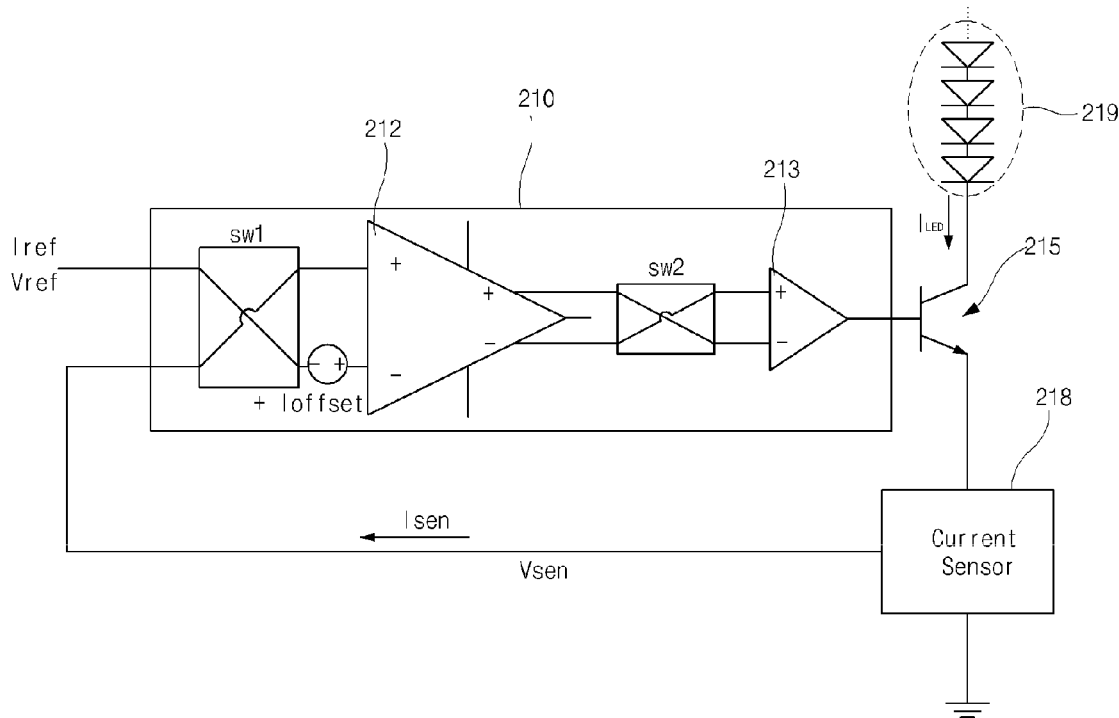
FIG. 4B is a circuit diagram of illustrating the controlling circuit unit during a second period according to the example embodiment of the present invention.

FIG. 4A is a circuit diagram of illustrating a controlling circuit unit during a first period according to an example embodiment of the present invention, and FIG. 4B is a circuit diagram of illustrating the controlling circuit unit during a second period according to the example embodiment of the present invention.

In FIGS. 4A and 4B, the controlling circuit unit of the integrated circuit 144 of FIG. 3 includes an operational amplifier (OP-AMP) 210, a control thin film transistor 215, and a current sensor 218. The operational amplifier 210 compares a constant current Iref applied from the outside and a sensing current Isen applied to a light-emitting diode array 219. A gate electrode of the control thin film transistor 215 is connected to an output terminal of the operational amplifier 210, a source electrode of the control thin film transistor 215 is connected to the light-emitting diode array 219, and a drain electrode of the control thin film transistor 215 is connected to the current sensor 218. The light-emitting diode array 219 includes light-emitting diodes connected to each other in series.

The operational amplifier 210 includes first and second comparators 212 and 213 and first and second switches sw1 and sw2. The operational amplifier 210 compares the constant current Iref applied from the outside and the sensing current Isen.

Here, successively, the first switch sw1 is connected to the first comparator 212, the first comparator 212 is connected to the second switch sw2, and the second switch sw2 is connected to the second comparator 213.

More particularly, the first switch sw1 is connected to the first comparator 212, and the second switch sw2 is disposed between the first comparator 212 and the second comparator 213 and connected to the first comparator 212 and the second comparator 213.

A constant voltage Vref and the constant current Iref, which are supplied from the integrated circuit 144 of FIG. 3, and a sensing voltage Vsen and the sensing current Isen, which are supplied from an output terminal of the current sensor 218, are inputted to the first switch sw1, and an output from the first switch sw1 is inputted to the first comparator 212.

An output from the first comparator 212 is inputted to the second switch sw2, and an output from the second switch sw2 is inputted to the second comparator 213.

At this time, the operational amplifier 210 compares the sensing current Isen and the constant current Iref and changes a voltage and a current of the control thin film transistor 215 connected to the output terminal of the operational amplifier 210 such that a value of the sensing current Isen is the same as a value of the constant current Iref, thereby controlling a luminous current $I_{LED}$.

By using the above-mentioned operation, the controlling circuit unit controls the luminous current $I_{LED}$ flowing through the light-emitting diode array 219 such that light is uniformly emitted.

Here, an offset current $I_{offset}$ is caused in the operational amplifier 210 due to a process variation of the integrated circuit 144 of FIG. 3, and an effect of the offset current $I_{offset}$ is counterbalanced by the first and second switches sw1 and sw2.

At this time, the first and second switches sw1 and sw2 operate oppositely at the first period and at the second period, thereby counterbalancing the effect of the offset current $I_{offset}$.

More particularly, with reference to FIG. 4A, during the first period, the first switch sw1 inputs the constant current Iref applied to the operational amplifier 210 into a non-inverting terminal (+) of the first comparator 212 and inputs the sensing current Isen into an inverting terminal (−) of the first comparator 212.

At this time, the sum of the sensing current Isen and the offset current $I_{offset}$ is inputted into the inverting terminal (−) of the first comparator 212 because of the offset current $I_{offset}$.

In addition, the second switch sw2 inputs an output from the non-inverting terminal (+) of the first comparator 212 into a non-inverting terminal (+) of the second comparator 213 and inputs an output from the inverting terminal (−) of the first comparator 212 into an inverting terminal (−) of the second comparator 213.

Meanwhile, with reference to FIG. 4B, during the second period, the first switch sw1 inputs the constant current Iref applied to the operational amplifier 210 into the inverting terminal (−) of the first comparator 212 and inputs the sensing current Isen into the non-inverting terminal (+) of the first comparator 212.

At this time, the sum of the constant value Iref and the offset current $I_{offset}$ is inputted into the inverting terminal (−) of the first comparator 212 because of the offset current $I_{offset}$.

In addition, the second switch sw2 inputs an output from the non-inverting terminal (+) of the first comparator 212 into the inverting terminal (−) of the second comparator 213 and inputs an output from the inverting terminal (−) of the first comparator 212 into the non-inverting terminal (+) of the second comparator 213.

Therefore, the operational amplifier 210 compares the constant current Iref and the sum of the sensing current Isen and the offset current $I_{offset}$ and outputs a first comparison result during the first period. The operational amplifier 210 compares the sensing current Isen and the sum of the constant current Iref and the offset current Ioffset and outputs a second comparison result during the second period.

Here, a repetition interval between the first and second periods may be set to a high frequency more than 40 KHz. By alternating the first and second switches sw1 and sw2, the luminous current $I_{LED}$ may be controlled by adding a value of the offset current $I_{offset}$ to a difference between the constant current Iref and the sensing current Isen or subtracting a value of the offset current $I_{offset}$ from a difference between the constant current Iref and the sensing current Isen. Therefore, the control thin film transistor 215 is controlled without an error due to the offset current $I_{offset}$ averagely during all periods.

In the meantime, the integrated circuit 144 of FIG. 3 includes the plurality of operational amplifiers 210, and an output of each operational amplifier 210 forms a channel.

At this time, a value of the offset current $I_{offset}$ at one channel of the integrated circuit 144 of FIG. 3 may be different from that at another channel of the integrated circuit 144 of FIG. 3.

Hereinafter, the first and second periods alternating each other will be described with reference to FIG. 5.

Figure 5:
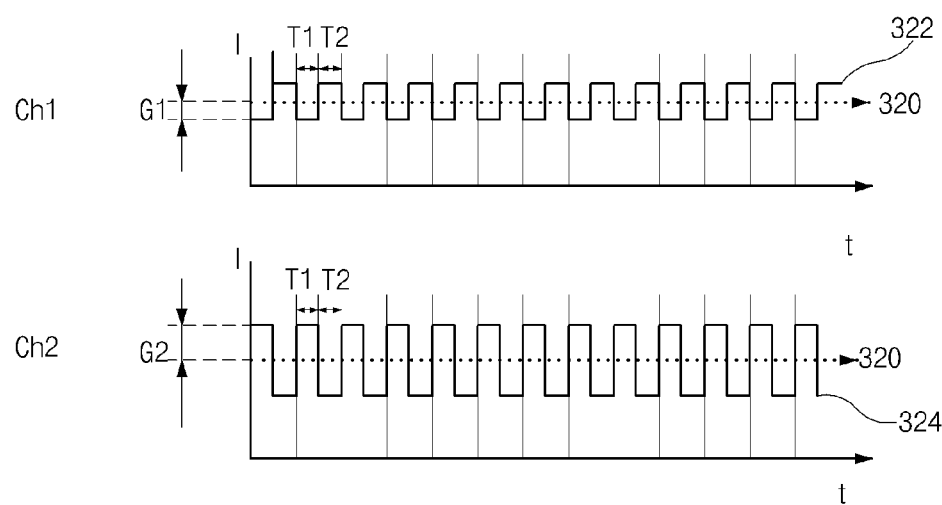
FIG. 5 is a view of illustrating a constant current and a sensing current according to time in a controlling circuit unit according to an example embodiment of the present invention.

FIG. 5 is a view of illustrating a constant current and a sensing current according to time in a controlling circuit unit according to an example embodiment of the present invention.

In FIG. 5, a luminous current value 322 at a first channel Ch1 is smaller than a constant current value 320 by a first difference G1 during the first period T1, and the luminous current value 322 at the first channel Ch1 is larger than the constant current value 320 by the first difference G1 during the second period T2.

Here, the first periods T1 and the second periods T2 alternate each other with the same interval, and the average of the luminous current value 322 of the first channel Ch1 has an approximate value to the constant current value 320.

Meanwhile, a luminous current value 324 at a second channel Ch2 is larger than the constant current value 320 by a second difference G2 during the first period T1, and the luminous current value 324 at the second channel Ch2 is smaller than the constant current value 320 by the second difference G2 during the second period T2.

Here, the first periods T1 and the second periods T2 alternate each other with the same interval, and the average of the luminous current value 324 of the second channel Ch2 has an approximate value to the constant current value 320.

Accordingly, even though the offset currents $I_{offset}$ of the first channel Ch1 and the second channel Ch2 have different values, the first and second switches sw1 and sw2 of FIG. 4A and FIG. 4B alternately operate at the first period and the second period such that the luminous current $I_{LED}$ has substantially the same value of the constant current value 320.

Thus, the luminous current $I_{LED}$ having the same value is applied to the backlight unit, and the brightness of the backlight unit is uniform.

Namely, each channel of the integrated circuit 144 outputs the luminous current $I_{LED}$ having substantially the same value as the constant current value, and the backlight unit produce the desirable brightness.

In the present invention, the controlling circuit unit includes the switches alternately operating, and the brightness of the backlight unit is uniformly produced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A backlight unit, comprising:
    a first switch receiving a constant current applied from an outside circuit and a sensing current;
    a first comparator receiving an output of the first switch;
    a second switch receiving an output of the first comparator;
    a second comparator receiving an output of the second switch;
    a thin film transistor having a gate electrode receiving an output of the second comparator;
    a light-emitting diode array connected to a source electrode of the thin film transistor; and
    a current sensor connected to a drain electrode of the thin film transistor,
    wherein the first switch inputs the constant current into a non-inverting terminal (+) of the first comparator and the sensing current into an inverting terminal (−) of the first comparator during a first period, and the first switch inputs the constant current into the inverting terminal (−) of the first comparator and the sensing current into the non-inverting terminal (+) of the first comparator during a second period, and
    wherein the second switch inputs an output of the non-converting terminal (+) of the first comparator into a non-inverting terminal (+) of the second comparator and an output of the inverting terminal (−) of the first comparator into an inverting terminal (−) of the second comparator during the first period, and the second switch inputs the output of the non-converting terminal (+) of the first comparator into the inverting terminal (−) of the second comparator and the output of the inverting terminal (−) of the first comparator into the non-inverting terminal (+) of the second comparator during the second period.

2. The backlight unit according to claim 1, wherein the first and second periods alternate each other with a frequency more than 40 KHz.

3. The backlight unit according to claim 1, wherein lengths of the first and second periods are 1:1.

4. The backlight unit according to claim 1, wherein an average value of a luminous current of the light-emitting diode array at the first and second periods is substantially the same as a value of the constant current.

5. The backlight unit according to claim 1, wherein the first switch, the first comparator, the second switch, the second comparator, the thin film transistor, the light-emitting diode array and the current sensor constitute a channel of an integrated circuit, and an offset current of one channel of the integrated circuit has a different value from an offset current of another channel of the integrated circuit.

6. The backlight unit according to claim 1, wherein the first switch inputs the constant current and a sum of the sensing current and the offset current into the first comparator during the first period and inputs the sensing current and a sum of the constant current and the offset current into the first comparator during the second period.

* * * * *